US010087308B2

(12) United States Patent
Yarzabal et al.

(10) Patent No.: US 10,087,308 B2
(45) Date of Patent: Oct. 2, 2018

(54) VULCANIZATION COMPOSITION FOR UNSATURATED POLYMERS

(71) Applicant: MLPC INTERNATIONAL, Rom-des-Landes (FR)

(72) Inventors: Isabelle Yarzabal, Herm (FR); Thierry Aubert, Lescar (FR); Pierre Lugez, Dax (FR)

(73) Assignee: MLPC INTERNATIONAL, Riom-des-Landes (FR)

( * ) Notice: Subject to any disclaimer, the term of this patent is extended or adjusted under 35 U.S.C. 154(b) by 0 days.

(21) Appl. No.: 15/271,878

(22) Filed: Sep. 21, 2016

(65) Prior Publication Data
US 2017/0121500 A1 May 4, 2017

Related U.S. Application Data

(63) Continuation of application No. 14/123,614, filed as application No. PCT/FR2012/051249 on Jun. 5, 2012, now abandoned.

(30) Foreign Application Priority Data

Jun. 6, 2011 (FR) ...................... 11 54904

(51) Int. Cl.
| *C08K 5/47* | (2006.01) |
| *C08J 3/24* | (2006.01) |
| *C08L 11/00* | (2006.01) |
| *C08K 5/00* | (2006.01) |

(52) U.S. Cl.
CPC ............. *C08K 5/47* (2013.01); *C08J 3/24* (2013.01); *C08K 5/0025* (2013.01); *C08J 2309/00* (2013.01); *C08J 2309/06* (2013.01); *C08J 2311/00* (2013.01); *C08L 11/00* (2013.01)

(58) Field of Classification Search
CPC .. C08L 9/06; C08L 11/00; C08L 23/16; C08L 23/283; C08K 5/0025; C08K 5/46; C08K 5/47; C08J 3/24; C08J 2309/00; C08J 2311/00; C08J 2315/02
See application file for complete search history.

(56) References Cited

U.S. PATENT DOCUMENTS

| 4,128,510 A | * | 12/1978 | Richwine ................ C08K 5/46 525/326.3 |
| 4,288,576 A | | 9/1981 | Richwine |
| 5,391,621 A | | 2/1995 | Ohm |
| 5,563,240 A | | 10/1996 | Graf |
| 2003/0153652 A1 | * | 8/2003 | Tsujimura ................ C08K 3/34 524/83 |

FOREIGN PATENT DOCUMENTS

| CN | 101096366 | | 1/2008 |
| EP | 0796890 | | 9/1997 |
| EP | 2272836 | | 1/2011 |
| JP | 2005-36141 | * | 2/2005 |

OTHER PUBLICATIONS

JP 2005-36141, Feb. 2005, machine translation.*
Ohm et al., An improved Curing System for Chlorine-Containing Polymers, Rubber World, 1997, pp. 33-38.
International Search Report for International Application No. PCT/FR2012/051249, dated Aug. 7, 2012, 4 pages.
Non Final Office Action for U.S. Appl. No. 14/123,614, dated Jul. 2, 2015, 11 pages.

* cited by examiner

Primary Examiner — Roberto Rabago
(74) Attorney, Agent, or Firm — RatnerPrestia

(57) ABSTRACT

The present invention relates to the field of vulcanization of unsaturated polymers, in particular halogenated, and more particularly chlorinated, unsaturated polymers, such as, for example, polychloroprene, using as vulcanization agent a mixture of bis(2,5-dimercapto-1,3,4-thiadiazole) and at least one organic base. The present invention relates to the process for vulcanization of said polymers with said vulcanization mixture.

20 Claims, 1 Drawing Sheet

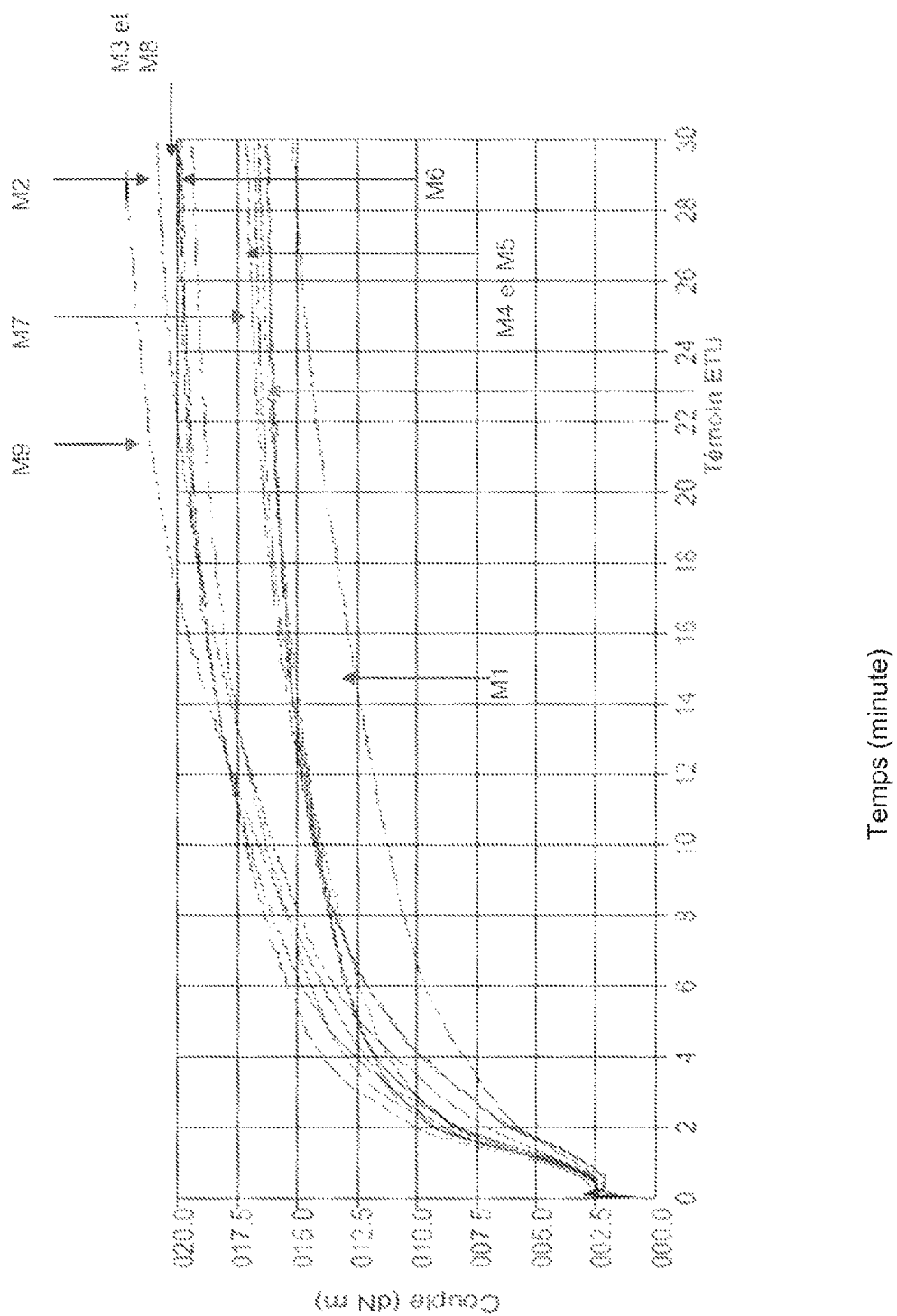

US 10,087,308 B2

VULCANIZATION COMPOSITION FOR UNSATURATED POLYMERS

CROSS REFERENCE TO RELATED APPLICATIONS

This application is a continuation of application Ser. No. 14/123,614, filed Dec. 3, 2013, abandoned, which is the U.S. National Phase Application of PCT International Application No. PCT/FR2012/051249, filed Jun. 6, 2012, and claims priority to French Patent Application No. 1154904, filed Jun. 6, 2011, the disclosures of which are incorporated by reference in their entirety for all purposes.

FIELD OF THE INVENTION

The present invention relates to the field of the vulcanization of unsaturated polymers, in particular unsaturated halogenated polymers, more particularly unsaturated chlorinated polymers, such as, for example, polychloroprene. The present invention relates in particular to the vulcanization agents which are employed in these processes as vulcanization accelerators.

BACKGROUND OF THE INVENTION

The accelerators used in the vulcanization of unsaturated polymers, polyolefins or rubbers, in particular halogenated rubbers, such as polychloroprene, are generally thiourea-based accelerators which today compose the crosslinking systems for rubbers having the best performance.

Ethylene thiourea (ETU) is the reference thiourea used today for the vulcanization of chlorinated rubbers, in particular polychloroprene. However, ETU is toxic in itself, classified in carcinogenic group 2, according to the classification of the European Union, the IARC (International Agency for Research on Cancer) and the EPA (Environmental Protection Agency).

It is consequently necessary to henceforth look for replacement products which are less toxic, which are more environmentally friendly and which exhibit an effectiveness at least as good as that of thiourea-based accelerators, in particular ETU, in vulcanization processes.

The literature already provides some examples of vulcanization agents or vulcanization accelerators other than thiourea derivatives. For example, U.S. Pat. No. 4,288,576 describes the use of 2,5-dimercapto-1,3,4-thiadiazole for the vulcanization of saturated chlorinated polymers, in the presence of a basic compound chosen from amines, amine salts, quaternary ammonium salts, aromatic guanidines and the condensation products of aniline with an aldehyde.

As other examples, U.S. Pat. No. 5,391,621 describes the use of certain organopolysulphide compounds derived from 1,3,4-thiadiazole as agents for the vulcanization of chlorinated polymers. Other polysulphides, poly[2,5-bis(polysulphano)-1,3,4-thiadiazoles], are described in U.S. Pat. No. 5,563,240, where they are of use as agents for the vulcanization of polychloroprene.

Patent Application EP 0 796 890 describes the vulcanization of halogenated acrylic rubbers in the presence of 2,5-dimercapto-1,3,4-thiadiazole or derivatives and of a metal dialkyldithiocarbamate.

More recently, Patent Application US 2003/153652 also presents compositions for vulcanizing chlorinated polymers, the said compositions resulting from the mixing of a zeolite compound with a vulcanization agent chosen from mercaptotriazines, thiadiazoles and thiurams.

The publication "An improved curing system for chlorine-containing polymers", by R. F. Ohm and T. C. Taylor (which appeared in "Rubber World", March 1997, pages 33 to 38), presents a comparative study between ETU and DMTD (2,5-dimercapto-1,3,4-thiadiazole), which are used as agents for the vulcanization of polychloroprene in combination with vulcanization activators.

Despite these solutions already put forward for the replacement of ETU, a need remains, however, for vulcanization compositions which are even more effective, in particular for the vulcanization of unsaturated polymers, especially of unsaturated halogenated polymers and more particularly of unsaturated chlorinated polymers, more environmentally friendly and capable of conferring, on the vulcanized polymers, mechanical properties and properties of resistance to ageing which are further improved.

SUMMARY OF THE INVENTION

A first objective of the present invention consists in providing an agent (or accelerator) for the vulcanization of unsaturated polymers, in particular of polyalkadienes, more particularly of unsaturated halogenated polymers, typically of unsaturated chlorinated polymers and in particular polychloroprene, the said agent or accelerator advantageously having to be nontoxic or only very slightly toxic and more environmentally friendly.

Another objective of the present invention consists in providing a vulcanization accelerator which is less toxic than ETU and in particular which does not release compounds of nitrosamine type.

Yet another objective consists in providing a vulcanization agent which confers, on the unsaturated polymers, in particular unsaturated halogenated polymers, for example unsaturated chlorinated polymers, in particular of polychloroprene type, mechanical properties equivalent to those obtained with systems employing toxic accelerators.

As another objective of the present invention, the vulcanization agent provided can confer good ageing properties on the polymers. In addition, an objective also consists in providing a vulcanization accelerator which makes it possible to increase the scorch time (or prevulcanization time).

Yet another objective consists in reducing the amount of inorganic vulcanization agents, generally metal oxides, in particular zinc and/or magnesium oxides, used in the vulcanization of unsaturated polymers, in particular unsaturated halogenated polymers, more specifically unsaturated chlorinated polymers, without affecting the mechanical, rheological and other properties thereof, thus making it possible to also reduce the amount of toxic effluents associated with the process, while also reducing the production costs.

The Applicant Company has now discovered that the abovementioned objectives can be achieved in all, or at least in part, by virtue of the use of the vulcanization accelerator which is a subject-matter of the invention which will be described in detail below.

BRIEF DESCRIPTION OF THE DRAWING

The FIGURE is a graph of the change in torque as a function of time for mixtures containing vulcanization formulations.

DETAILED DESCRIPTION OF THE INVENTION

According to a first aspect, the invention relates to the use, as agent for the vulcanization of unsaturated polymers, in particular unsaturated halogenated polymers, more particularly unsaturated chlorinated polymers, of at least one mixture comprising bis(2,5-dimercapto-1,3,4-thiadiazole), denoted bis-DMTD in the continuation of the present description, and at least one organic base.

bis-DMTD corresponds to one of the two following structures, depending on the tautomeric forms selected:

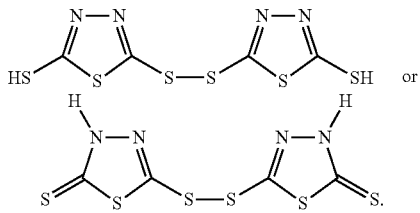

The process for the manufacture of bis-DMTD has been known for many years and is, for example, described in Patent Application CN-A-101096366. A process for the preparation of bis-DMTD which is even more environmentally friendly has recently been described in Patent Application EP-A-2 272 836.

bis-DMTD is today mainly used in lubricant compositions but is used to a very slight extent in compositions comprising natural, artificial or synthetic rubbers, where it generally acts as preservative and has never been described as such as an additive for the vulcanization of unsaturated polymers. bis-DMTD does not generate nitrosamines.

The organic base used in combination (mixture) with the bis-DMTD can be of any type known to a person skilled in the art. However, preference is given to nitrogenous organic bases and more particularly guanidines, which are optionally substituted, with which an entirely unexpected effect of improving the kinetics of vulcanization and the scorch time has been observed, when they are used in combination with bis-DMTD.

Entirely noteworthy results have been obtained with guanidines substituted by one or more aryl groups, preferably by one or two aryl groups, preferably by two aryl groups. An organic base which is altogether preferred in the context of the present invention is diphenylguanidine.

As a general rule, the bis-DMTD/organic amine molar ratio is between 1:99 and 99:1, preferably between 25:75 and 75:25, for example approximately 50:50.

According to an alternative form of the invention, preference is given to a vulcanization composition in which the bis-DMTD/organic amine molar ratio is between 40:60 and 99:1, preferably between 50:50 and 99:1, more preferably between 60:40 and 99:1, entirely preferably between 70:30 and 99:1.

The polymers which can advantageously be vulcanized by virtue of the abovementioned mixture are unsaturated polymers, in particular unsaturated halogenated polymers, more particularly unsaturated chlorinated polymers. More specifically, the polymers targeted in the present invention are all the polymers and copolymers comprising at least one ethylenic unsaturation, among which may be mentioned, as nonlimiting examples, natural, artificial or synthetic rubbers, poly(butadienes), styrene and butadiene copolymers (SBRs), acrylonitrile and butadiene copolymers (NBRs), ethylene/propylene/diene copolymers (EPDMs), butyl rubbers, SBSs, halogenated polyalkadienes, in particular chlorinated polyalkadienes, and others, as well as the mixtures of these homopolymers and copolymers in all proportions.

According to a preferred aspect, the chlorinated polyalkadienes comprise more than 1% by weight of chlorine, preferably more than 2% by weight of chlorine and more preferably approximately 5% by weight of chlorine. The chlorine content can reach up to 40% by weight of chlorine, with respect to the total weight of the polymer.

Mention may be made, as examples of such chlorinated polyalkadienes, without implied limitation, of chloroprene rubbers or polychloroprenes, chlorinated natural rubbers, chlorinated polyolefins, chlorinated butyl rubbers and others.

According to one embodiment of the present invention, preference is very particularly given to the use of the abovementioned vulcanization mixture for the vulcanization of polychloroprene, denoted CR in the continuation.

Such mixtures can comprise from 10% by weight to 90% by weight of each of the polymers, preferably from 25% by weight to 75% by weight, with respect to the total weight of the polymers in the mixtures.

According to a preferred embodiment, the chlorinated polymers which can be used in the context of the present invention are chlorinated polymers comprising one or more ethylenic unsaturations and, entirely preferably, the chlorinated polymers targeted in the present invention are polychloroprenes, alone or as blends with other homopolymers and/or copolymers, as indicated above.

The bis-DMTD, in combination with an organic base, in particular a nitrogenous organic base, more particularly a guanidine, acts synergistically in the vulcanization of the unsaturated polymers. bis-DMTD appears to be a good sulphur donor, which makes it a good vulcanization agent. The amine bases promote, on the one hand, the release of the sulphur present in the bis-DMTD, which improves the properties of the vulcanisate, and, on the other hand, they improve the kinetics of vulcanization, while maintaining a certain scorch safety.

According to another embodiment, sulphur can be added to the vulcanization process employing the vulcanizing composition according to the present invention. This is because it has been discovered that the addition of a small amount of sulphur to the bis-DMTD can catalyse the reaction and thus increase the bridging density. This makes it possible to obtain a very high degree of crosslinking, which confers excellent compression set properties and also very slight swellings in oil of the vulcanized polymer thus obtained.

According to yet another embodiment, the bis-DMTD can additionally be employed on an elastomer support, in order to promote the dispersion thereof and thus to reduce the mixing times.

The use of bis-DMTD, in combination with at least one organic base, for example a guanidine, as vulcanization accelerator has proved to be entirely effective during the vulcanization of polychloroprene. In particular, the kinetics of vulcanization employing a bis-DMTD/organic base mixture have proven to be comparable, indeed even superior, to the kinetics of vulcanization observed in the presence of ETU.

In addition to rapid kinetics of vulcanization, the use of the bis-DMTD/organic base mixture in place of ETU as vulcanization agent makes it possible to confer, on the unsaturated polymers, in particular unsaturated halogenated polymers, a good tear strength and a good tensile strength, and also good resistance to ageing.

A decrease in the crystallization effect by an increase in the bridging degree has also been observed. This represents a considerable advantage when it is known that the crystallization is a very harmful phenomenon well known to a person skilled in the art which brings about hardening of the CR-base mixtures, which limits their lifetime.

As another advantage, it has likewise been observed that the scorch time of the unsaturated polymers vulcanized by the bis-DMTD/organic base mixture can be effectively controlled by means of retardants appropriate to this novel vulcanization system (for example MBTS and/or CTPI in polychloroprene).

According to an embodiment of the present invention, the bis-DMTD/organic base mixture is advantageously used as accelerating agent for the vulcanization of chlorinated polymers, in combination with one or more inorganic vulcanization agents well known to a person skilled in the art. According to a preferred aspect, the inorganic vulcanization agents are chosen from metal oxides and in particular from zinc oxide (ZnO), magnesium oxide (MgO) and others, and also the mixtures of two or more of them in all proportions.

According to another aspect, the present invention relates to the process for the vulcanization of an unsaturated polymer, the said process comprising at least the following stages:
   mixing the said unsaturated polymer with the bis-DMTD/organic base mixture, optionally sulphur and optionally one or more inorganic vulcanization agents, as described above,
   vulcanizing the said unsaturated polymer, according to procedures known to a person skilled in the art, and
   recovering the said vulcanized unsaturated polymer.

The mixing of the unsaturated polymer with the bis-DMTD/organic base combination can be carried out according to any technique known per se, for example as a masterbatch (with regard to molten polymer, solid polymer, as granules, as chips, and others) or in paste form (for example with regard to wax or with a high oil content). The bis-DMTD and the organic base can be added simultaneously or separately. As indicated above, the bis-DMTD can be introduced in the supported form, for example supported on an olefin, in order to reduce the mixing time of the said bis-DMTD with the polymer to be vulcanized.

In order to carry out the vulcanization, as a function of the final properties required, sulphur can be added simultaneously or before or subsequently to the bis-DMTD/organic base mixture and simultaneously or before or subsequently to the inorganic agents (in particular metal oxides). A person skilled in the art, familiar with the techniques and conditions for the vulcanization of unsaturated polymers, will know how to adapt the process of the invention as a function of the nature of the vulcanization agents and of the polymers which he wishes to vulcanize.

Thus, the vulcanization is carried out according to any procedure known to a person skilled in the art, at a temperature, at a pressure and for a period of time which is appropriate according to the nature and the type of vulcanization carried out.

Various additives can be added during the vulcanization process according to the present invention. These additives are well known to a person skilled in the art and can be chosen, as nonlimiting examples, from lubricants, fillers, colourants, preservatives, antioxidants, heat stabilizers, UV stabilizers, vulcanization inhibitors or retardants, such as MBTS (mercaptobenzothiazole disulphide), CTPI (N-cyclohexylthiophthalimide), and others.

According to a preferred alternative form of the process of the present invention, the vulcanization can be carried out by simultaneously adding a mixture of the vulcanization agents, in or not in combination with the covulcanization agents and other additives. Such a mixture ("mixture for vulcanization") can thus comprise one or more of the following ingredients, which will be premetered according to the nature of the chlorinated polymer and the degree of vulcanization thereof desired: sulphur, bis-DMTD, organic base, inorganic agents and additive(s).

The present invention is now illustrated by means of the examples which follow and which do not have any limiting aim from the viewpoint of the scope of the present invention, which is defined by the appended claims.

EXAMPLES

Example 1

Polychloroprene (CR) Vulcanization Test

All the mixtures are prepared in a 2.5 l Repiquet internal mixer with a stirring speed of 50 revolutions/min and a filling coefficient of 1.4. The CR base used exhibits the following composition (denoted "CR A base" in the continuation), in which the parts are expressed by weight:

| CR A base - Materials | Parts |
|---|---|
| Neoprene WRT | 100 |
| N550 (carbon black) | 50 |
| Kaolin grade B | 20 |
| DINP (phthalate oil) | 20 |
| Elastomag ® 170 (MgO) | 4 |
| Stearin | 0.5 |
| Total | 194.5 |

The mercaptan-grade neoprene WRT is generally vulcanized in the presence of ETU, used as vulcanization accelerator, which confers the best results in terms of compression set (CS) and ageing. As indicated above, ETU is a toxic product due to its chemical nature and exhibits risks when used: ETU is regarded as carcinogenic by ingestion, mutagenic or also as exhibiting risks of sterility by simple contact with the skin.

The present study shows that ETU can be advantageously replaced by the vulcanization mixture according to the invention. This study is carried out using an appropriate 3×3 experimental plan. This experimental plan makes it possible to simultaneously vary three parameters over three levels by using the symmetry conditions of a cube. For this plan, the working hypotheses are as follows:
   linear incrementation in the variables X1, X2 and X3;
   variation in the calculation values from −1 to +1 (methods);
   necessary changes in variables: experimental parameters towards the calculation variables, for the interpretation of the results;
   no taking into account of the cross interactions: X1X2, X1X3, X2X3;
   no equidistances between the values;
   accuracy of 10 to 15%;
   second-degree equations.

This experimental plan makes it possible to obtain the change in the properties with 9 mixtures instead of 27. The following parameters were used:
   X1: bis-DMTD: 0.5/0.75/1 (proportions by weight)
   X2: DPG: 0.1/0.2/0.3 (proportions by weight)
   X3: sulphur: 0/0.25/0.5 (proportions by weight)

The respective proportions by weight (parts by weight) of the variables X1, X2 and X3 for the 9 tests (formulations F1 to F9) are collated in the following Table 1, in which the bis-DMTD is in the powder form (sold by MLPC International), the DPG is Mixland®+ DPG 80 GA F140 (sold by MLPC International), and the sulphur is Mixland®+ SM300 80 GA F140 (sold by MLPC International):

TABLE 1

|  | F1 | F2 | F3 | F4 | F5 | F6 | F7 | F8 | F9 |
|---|---|---|---|---|---|---|---|---|---|
| bis-DMTD | 0.5 | 0.75 | 1 | 1 | 0.5 | 0.75 | 0.75 | 1 | 0.5 |
| DPG | 0.1 | 0.1 | 0.1 | 0.2 | 0.2 | 0.2 | 0.3 | 0.3 | 0.3 |
| Sulphur | 0 | 0.25 | 0.5 | 0 | 0.25 | 0.5 | 0 | 0.25 | 0.5 |

These 9 formulations are used to prepare 9 mixtures M1 to M9 respectively, with 194.5 parts by weight of the CR A base, 5 parts by weight of Mixland®+ ZnO 90 GA F100 (zinc oxide, ZnO, sold by MLPC International), 1 part by weight of paraffin and 1 part by weight of antioxidant Ekaland® 100, sold by MLPC International. A control mixture, denoted M0, devoid of sulphur, is similarly prepared with 194.5 parts by weight of the CR A base and 0.75 part by weight of ETU, instead of the bis-DMTD+DPG mixture.

The mixtures are prepared so as to obtain a blank weighing approximately 600 g, corresponding to 2 plaques with a thickness of 2 mm, and the production of the CS graphs. Vulcanization is carried out to $T_{90}$ (vulcanization time for obtaining 90% of the maximum torque) at 170° C.

The mixtures M1 to M9 and M0 are characterized mechanically (rheometric study). The change in the torque as a function of time, at a temperature of 170° C., is shown in FIG. 1. It is noticed that the mixtures M2 to M9 according to the invention exhibit a greater torque than that of the control mixture M0, where the vulcanization agent used is ETU.

The mixtures M1 to M9 are characterized mechanically and the data collected are used in the matrix of the experimental plan, which makes it possible to obtain a theoretical change in the properties of the mixtures vulcanized with bis-DMTD. The experimental plan makes it possible to obtain a change in 3D of the properties.

From this experimental plan, it can be accepted that DPG has a synergistic effect with the bis-DMTD, favouring the release of the sulphur atoms present in the bis-DMTD and thus improving the final properties of the material. It can also be deduced that the sulphur acts as catalyst of the reaction.

In conclusion, at the end of this experimental plan, two formulae can be selected as a function of the specifications to be achieved:
- the mixture M7, which gives excellent results in ageing, better than with the ETU-base control formula M0;
- an optimized mixture M10 (cf. Table 2), the composition of which was deduced from the experimental plan and which gives better results than with ETU at 70° C., in CS and in terms of swelling with oil.

TABLE 2

|  | M0 | M7 | M10 |
|---|---|---|---|
| CR A base | 194.5 | 194.5 | 194.5 |
| Ekaland ® 100 (antioxidant) | 1 | 1 | 1 |
| Paraffin | 1 | 1 | 1 |
| Mixland ® + ZnO 90 GA F100 | 5 | 5 | 5 |
| Mixland ® + ETU 80 GA F140 | 0.75 | — | — |
| bis-DMTD powder (MLPC International) | — | 0.75 | 0.5 |
| Mixland ® + SM300 80 GA F140 | — | 0.3 | 0.25 |
| Mixland ® + DPG 80 GA F140 | — | — | 0.2 |

Rheometry on an MDR at 170° C.—according to Standard NFT 46-006 (or ISO 6502)

|  | M0 | M7 | M10 |
|---|---|---|---|
| $C_{max}$-$C_{min}$ (dN.m) | 14.1 | 14.6 | — |
| $t_s$ 1 (min) | 1.1 | 0.82 | — |
| $t_c$ 90 (min) | 12.3 | 15.2 | — |

Scorch time on a Mooney viscometer at 125° C.—according to Standard NFT 43-004 (or ISO 289-2)

|  | M0 | M7 | M10 |
|---|---|---|---|
| MS t3 | 9.25 | 6.1 | — |
| MS t10 | 13.3 | 10.5 | — |
| MS t18 | 24.3 | 14.8 | — |

Dynamometric properties—according to Standard NFT 46-002 (or ISO 37)

|  | M0 | M7 | M10 |
|---|---|---|---|
| TS: Tensile strength (MPa) | 17 | 17 | 17.5 |
| Eb: Elongation at break (%) | 360 | 437 | 438 |
| M100: Modulus at 100% (MPa) | 3.9 | 3.9 | 3.8 |
| M200: Modulus at 200% (MPa) | 8.5 | 7.9 | 7.9 |
| M300: Modulus at 300% (MPa) | 14.1 | 12.2 | 12.6 |
| Tearing (kN/m) according to Standard NFT 46-033 (or ISO 34-2) | 41 | 44 | 44 |
| Shore A hardness according to Standard NFT 46-052 (or ISO 868) | 67 | 67 | 64 |

Ageing, air, 72 hours, at 100° C.—according to Standard NFT 46-004 (or ISO 188)

|  | M0 |  | M7 |  | M10 |  |
|---|---|---|---|---|---|---|
| TS (MPa) | 16.8 | -1.4% | 16.9 | -0.7% | 17.4 | -1.0% |
| Eb (%) | 298 | -17.3% | 329 | -24.6% | 354 | -19.1% |
| M100 (MPa) | 5.3 | 36.3% | 5.6 | 44.5% | 5.5 | 43.3% |
| M200 (MPa) | 11.5 | 30.1% | 10.9 | 37.9% | 10.7 | 36.5% |
| M300 (MPa) | — | — | 15.7 | 28.3% | 15.5 | 23.8% |

Ageing, air, 7 days, 100° C.—according to Standard NFT 46-004 (or ISO 188)

|  | M0 |  | M7 |  | M10 |  |
|---|---|---|---|---|---|---|
| TS (MPa) | 17 | -0.1% | 16.3 | -3.9% | — | — |
| Eb (%) | 275 | -23.5% | 293 | -32.8% | — | — |
| M100 (MPa) | 6.3 | 62.3% | 6.3 | 61.6% | — | — |
| M200 (MPa) | 12.8 | 50.3% | 12 | 52.0% | — | — |

TABLE 2-continued

Ageing, air, 10 days, 100° C.—according to Standard NFT 46-004 (or ISO 188)

|  | M0 | | M7 | | M10 |
|---|---|---|---|---|---|
| TS (MPa) | 18 | 5.1% | 16.4 | −3.2% | — — |
| Eb (%) | 273 | −24.1% | 291 | −33.3% | — — |
| M100 (MPa) | 7.2 | 85.0% | 6.5 | 66.0% | — — |
| M200 (MPa) | 13.7 | 61.0% | 12.2 | 55.3% | — — |

Ageing, air, 72 hours, at 70° C.—according to Standard NFT 46-004 (or ISO 188)

|  | M0 | M7 | M10 |
|---|---|---|---|
| Swelling in oil (%) ISO R1817 | 39.3 | 40.6 | 32.8 |
| CS at 25% (%)* | 21.5 | 21.4 | 11.7 |

*according to standard NFT 46-011 (or ISO 815)

The coupling of bis-DMTD with an organic base (in this case, a guanidine, DPG), with or without the use of sulphur as catalyst, meets the environmental requirements by providing an unclassified system and not producing nitrosamines, while guaranteeing, to the users, the final properties expected for a polychloroprene mixture.

In addition, this bis-DMTD/organic base (in the example, DPG) mixture makes it possible to reduce the content of ZnO necessary, without affecting the properties of the final product. In point of fact, reducing the metal oxides is one of the major ways of improving the environmental impact. The coupling provided in the present invention, due to the reduction in the content of ZnO, thus contributes to new environmental regulations.

Two mixtures are prepared from the mixture M7, which mixtures are denoted M7−2 and M7+2 and in which the zinc oxide contents are respectively −2 parts and +2 parts, with respect to the 5 parts present in the mixture M7. The results obtained with use of metal oxides are presented in the following Table 3:

TABLE 3

|  | M0 | M7 | M7 − 2 | M7 + 2 |
|---|---|---|---|---|
| CR A base | 194.5 | 194.5 | 194.5 | 194.5 |
| Ekaland ® 100 | 1 | 1 | 1 | 1 |
| Paraffin | 1 | 1 | 1 | 1 |
| Mixland ® + ZnO 90 GA F100 | 5 | 5 | 3 | 7 |
| Mixland ® + ETU 80 GA F140 | 0.75 | — | — | — |
| Ekaland ® bis-DMTD | — | 0.75 | 0.75 | 0.5 |
| Mixland ® + DPG 80 GA F140 | — | 0.2 | 0.2 | 0.2 |
| Rheometry on an MDR at 170° C. - according to Standard NFT 46-006 (or ISO 6502) | | | | |
| $C_{max} - C_{min}$ (dN · m) | 14.1 | 14.6 | 14 | 14.25 |
| $t_s$ 1 (min) | 1.1 | 0.76 | 0.77 | 0.76 |
| $t_c$ 90 (min) | 12.3 | 14.2 | 14 | 14.2 |
| Scorch time on a Mooney viscometer at 125° C. according to Standard NFT 43-004 (or ISO 289-2) | | | | |
| MS t3 | 9.7 | 6.1 | 5.9 | 6 |
| MS t10 | 13.3 | 10.5 | 10.5 | 10.5 |
| MS t18 | 24.3 | 14.8 | 15.2 | 14.9 |

Tests were also carried out in order to measure the influence of certain known retardants used to increase the scorch time. The retardants tested here are MBTS (mercaptobenzothiazole disulphide) and CTPI (N-cyclohexylthiophthalimide). The mixtures M11 and M12 were prepared and tested. The compositions of the mixtures M11 and M12, and their performances, with respect to the mixtures M0 and M7, are presented in the following Table 4:

TABLE 4

|  | M0 | M7 | M11 | M12 |
|---|---|---|---|---|
| CR A base | 194.5 | 194.5 | 194.5 | 194.5 |
| Ekaland ® 100 | 1 | 1 | 1 | 1 |
| Paraffin | 1 | 1 | 1 | 1 |
| Mixland ® + ZnO 90 GA F100 | 5 | 5 | 5 | 5 |
| Mixland ® + ETU 80 GA F140 | 0.75 | — | — | — |
| bis-DMTD powder (MLPC International) | — | 0.75 | 0.75 | 0.75 |
| Mixland ® + SM300 80 GA F140 | — | — | — | 0.5 |
| Mixland ® + DPG 80 GA F140 | — | 0.2 | 0.2 | 0.2 |
| Mixland ® + CTPI 80 GA F500 | — | — | — | 1 |
| Mixland ® + MBTS 80 GA F140 | — | — | 2 | — |
| Rheometry on an MDR at 170° C. - according to Standard NFT 46-006 (or ISO 6502) | | | | |
| $C_{max} - C_{min}$ (dN · m) | 14.1 | 14.6 | 12.6 | 15.7 |
| $t_s$ 1 (min) | 1.1 | 0.76 | 0.8 | 0.9 |
| $t_c$ 90 (min) | 12.3 | 14.2 | 9 | 9.8 |
| Scorch time on a Mooney viscometer at 125° C. according to Standard NFT 43-004 (or ISO 289-2) | | | | |
| MS t3 | 9.7 | 6.1 | 8.5 | 9.1 |
| MS t10 | 13.3 | 10.5 | 13.1 | 14.5 |
| MS t18 | 24.3 | 14.8 | 16.4 | 18.1 |

Example 2

Styrene/Butadiene Rubber (SBR) Vulcanization Test

As for Example 1 above, the mixing of components is carried out in a 2.5 l Repiquet internal mixer at 50 revolutions/min with a filling coefficient of 1.4.

An "SBR base" is thus prepared, for which the natures and amounts of materials introduced into the mixer are as follows (the parts are expressed by weight):

| Materials | Parts |
|---|---|
| SBR 1502 | 100 |
| N220 (carbon black) | 51 |
| Exarol 25 oil | 11.5 |
| Total | 162.5 |

Two formulations S1 and S2 for vulcanization are prepared which have the characteristics presented in the following Table 5:

TABLE 5

|  | S1 | S2 |
|---|---|---|
| SBR base | 162.5 | 162.5 |
| Mixland ® + ZnO 90 GA F100 | 5 | 5 |
| Stearic acid | 3 | 3 |
| Ekaland ® DPG c | 0 | 0.5 |
| bis-DMTD powder (MLPC Intl) | 0.5 | 0.5 |
| Mixland ® + SM300 80 GA F140 | 2 | 2 |
| Rheometry on an MDR at 170° C. - according to Standard NFT 46-006 (or ISO 6502) | | |
| ΔC (dN · m) | 9.32 | 11.35 |
| $t_s$ 1 (min) | 2.16 | 1.72 |
| $t_c$ 90 (min) | 23.9 | 16.3 |

The amine compounds (in this instance DPG) act synergistically with the bis-DMTD: the DPG promotes the release of sulphur, which increases the bridging degree and improves the kinetics of vulcanization.

Example 3

EPDM Vulcanization Test

As for the preceding examples, the mixing is carried out in a 2.5 l Repiquet internal mixer at 50 revolutions/min and a filling coefficient of 1.4.

The "EPDM base" used exhibits the following composition, in which the parts are expressed by weight:

| Materials | Parts |
|---|---|
| EPDM Keltan ® 512 × 50 | 150 |
| ZnO, active | 4 |
| Carbon black N550 | 111 |
| Liquid paraffin | 17 |
| Total | 282 |

The results of tests carried out with 4 formulations denoted E1, E2, E3 and E4 and prepared from the above EPDM base are presented in the following Table 6:

TABLE 6

| | E1 | E2 | E3 | E4 |
|---|---|---|---|---|
| EPDM base | 282 | 282 | 282 | 282 |
| Stearic acid | 2 | 2 | 2 | 2 |
| Ekaland ® ZBEC pd | 1.4 | 1.4 | 1.4 | 1.4 |
| Mixland ® + ZDTP 50 GA F500 | 3 | 3 | 3 | 3 |
| Mixland ® + DPG 80 GA F140 | 0.5 | 0 | 0.5 | 0.5 |
| bis-DMTD powder (MLPC Intl) | 0 | 0.5 | 0.5 | 1 |
| Mixland ® + SM300 80 GA F140 | 2 | 2 | 2 | 2 |
| Rheometry on an MDR at 170° C. - according to Standard NFT 46-006 (or ISO 6502) | | | | |
| ΔC (dN · m) | 10.8 | 10.6 | 10.9 | 11.3 |
| $t_s$ 1 (min) | 0.36 | 0.43 | 0.39 | 0.43 |
| $t_c$ 90 (min) | 3.38 | 3.41 | 3.32 | 3.28 |

On comparing the formulations E1 and E2, it is found that bis-DMTD is equivalent in rheometry as replacement for DPG with a better scorch safety. On comparing the formulations E2 and E3, a synergistic effect is observed between bis-DMTD and DPG: a better bridging degree and a reduced vulcanization time are obtained, while maintaining the scorch safety. Finally, on comparing the results obtained with formulations E3 and E4, it is noted that the increase in the amount of bis-DMTD further accentuates the synergistic effect.

What is claimed:

1. A composition for the vulcanization of chlorinated polyalkadienes, comprising a mixture of
   a chlorinated polyalkadiene,
   bis(2,5-dimercapto-1,3,4-thiadiazole),
   sulphur, and
   at least one organic base,
   wherein the organic base comprises a guanidine substituted by one or more aryl groups,
   wherein the composition does not comprise a zeolite, and
   wherein the bis(2,5-dimercapto-1,3,4-thiadiazole) to organic base molar ratio is between 25:75 and 75:25.
2. The composition according to claim 1, wherein the at least one organic base is a guanidine substituted by two aryl groups.
3. The composition according to claim 1, wherein the at least one organic base comprises diphenylguanidine.
4. The composition according to claim wherein the bis(2,5-dimercapto-1,3,4-thiadiazole) to organic base molar ratio is approximately 50:50.
5. A process for the vulcanization of a chlorinated polyalkadiene, comprising:
   mixing the chlorinated polyalkadiene with a mixture of bis(2,5-dimercapto-1,3,4-thiadiazole), sulphur, and at least one organic base, wherein the organic base comprises a guanidine substituted by one or more aryl groups, wherein the mixture does not comprise a zeolite and wherein the bis(2,5-dimercapto-1,3,4-thiadiazole) to organic base molar ratio is between 25:75 and 75:25, and
   vulcanizing the chlorinated polyalkadiene.
6. The process according, to claim 5, wherein mixing the chlorinated polyalkadiene with a mixture of bis(2,5-dimercapto-1,3,4-thiadiazole) and at least one organic base further comprises mixing the chlorinated polyalkadiene with sulphur and/or one or more inorganic vulcanization agents.
7. The process according to claim 5, further comprising adding one or more additives chosen from lubricants, fillers, colourants, preservatives, antioxidants, heat stabilizers, UV stabilizers, and vulcanization inhibitors or retardants.
8. The process according to claim 5, wherein the chlorinated polyalkadiene is chosen from chloroprene rubbers or polychloroprenes, chlorinated natural rubbers, chlorinated polyolefins, chlorinated butyl rubbers, and mixtures thereof.
9. The process according to claim 8, wherein the chlorinated, polyalkadiene comprises polychloroprene.
10. The process according to claim 5, wherein base comprises a guanidine substituted by two aryl groups.
11. The process according to claim 10, wherein the organic base is diphenylguanidine.
12. The process according to claim 5, wherein the bis(2,5-dimercapto-1,3,4-thiadiazole) to organic base molar ratio is approximately 50:50.
13. The composition according to claim 1, wherein the sulphur is present in the composition in a ratio of up to 1:1 by weight with respect to the amount of bis(2,5-dimercapto-1,3,4-thiadiazole).
14. The process according to claim 5 herein the sulphur is present in the mixture, in a ratio of up to 1:1 by weight with resect the amount of bis(2,5-dimercapto-1,3,4-thiadiazole).
15. The composition according to claim 1, wherein the chlorinated polyalkadiene is chosen from chloroprene rubbers or polychloroprenes, chlorinated natural rubbers, chlorinated polyolefins, chlorinated butyl rubbers, and mixtures thereof.
16. The composition according to claim 15, herein the chlorinated polyalkadiene comprises polychloroprene.
17. The composition according to claim 1, wherein the chlorinated polyalkadiene is polychloroprene.
18. The process according to claim 5, wherein the chlorinated polyalkadiene is polychloroprene.
19. The composition according to claim 1, wherein the chlorinated polyalkadiene is polychloroprene, and the organic base is diphenylguanidine.
20. The method according to claim 5 wherein the chlorinated polyalkadiene is polychloroprene, and the organic base is diphenylguanidine.

* * * * *